L. A. Smith.
Horseshoe.

N° 80,778.        Patented Aug. 4, 1868.

Witnesses:
Leopold Query
Jn° D. Patten

Inventor.
L. A. Smith.
her Alexander O'Mahon
Atty's.

United States Patent Office.

LEMUEL A. SMITH, OF PEKIN, ILLINOIS.

Letters Patent No. 80,778, dated August 4, 1868.

IMPROVEMENT IN HORSE-SHOES.

The Schedule referred to in these Letters Patent and making part of the same.

TO ALL WHOM IT MAY CONCERN:

Be it known that I, LEMUEL A. SMITH, of Pekin, in the county of Tazewell, and in the State of Illinois, have invented certain new and useful Improvements in Horse-Shoes; and do hereby declare that the following is a full, clear, and exact description thereof, reference being had to the accompanying drawings, and to the letters of reference marked thereon.

The nature of my invention consists in the construction of a horse-shoe, in which I dispense with the nails generally used for fastening horse-shoes to horses' hoofs, and which is so arranged that it can more readily be put on or taken off, and prevents the hoof from sliding or being injured.

In order to enable others skilled in the art to make and use my invention, I will now proceed to describe its construction and operation, referring to the annexed drawings, which form a part of this specification, and in which—

Figure 1:
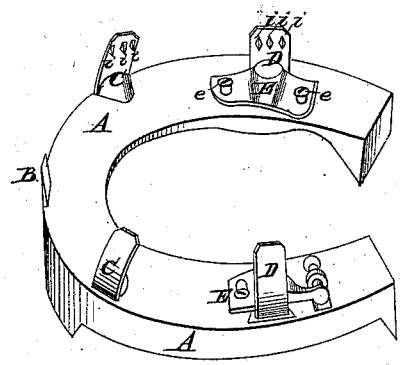
Figure 2:
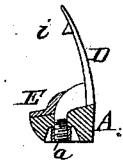

Figure 1 is a perspective view, and
Figure 2 is a section through one of the braces.

A represents a horse-shoe, made in any of the known and usual ways, but in which the holes for nails are dispensed with, and in their places I make four round holes only, two on each side of the shoe, at suitable distance from the heels and toe, said holes being provided with recesses on the bottom or under side, and the use of which holes will be hereinafter set forth.

At the toe of the shoe A, on its upper side, is a projection, B, against which the toe of the hoof is placed, so that the hoof cannot by any means slip forward when the shoe is put on.

C C and D D represent clips, which are provided with screw-shanks $a\ a$, and on their inner side with pins $i\ i$, as shown in fig. 2.

The shanks $a\ a$ are put in the holes on the shoe from the upper side, and fastened by nuts in the recesses on the under side. The pins $i\ i$, at the same time, penetrate into the sides of the hoof, holding the shoe firmly on the hoof.

The two clips C C are placed so far forward that they will not only bind the shoe, but, at the same time, in connection with the projection B, prevent it from slipping forward.

On the upper side of the shoe, on the inside from the holes for the clips D D, braces E E are placed, so that the clips may be regulated.

These braces are provided at each end with a slot, through which screws $e\ e$ pass into the shoe, and by moving the braces further in or out, it will be seen that the clips D D come closer together or farther apart, as may be desired to suit the size of the hoof.

The braces E E, instead of having a slot at each end, may have a slot at one end only, and be regulated by a set-screw at the other, as shown in fig. 1.

Having thus fully described my invention, what I claim as new, and desire to secure by Letters Patent, is—

The braces E E, constructed and regulated as described, for the purpose of moving the clips D D in or out, as may be desired, substantially as herein set forth.

In testimony that I claim the foregoing, I have hereunto set my hand, this 14th day of July, 1868.

LEMUEL A. SMITH.

Witnesses:
WM. N. BOTTOMLEY,
WILLIAMSON FARTHING.